United States Patent [19]

Whitehead

[11] Patent Number: 4,912,605
[45] Date of Patent: Mar. 27, 1990

[54] ILLUMINATION SYSTEM WHICH REDUCES LOSS OF VISIBILITY CAUSED BY LAMP FAILURE

[75] Inventor: Lorne Whitehead, Vancouver, Canada

[73] Assignee: TIR Systems Ltd., Burnaby, Canada

[21] Appl. No.: 247,370

[22] Filed: Sep. 21, 1988

[51] Int. Cl.[4] .................................. F21Y 8/00
[52] U.S. Cl. ........................... 362/32; 362/84; 362/300
[58] Field of Search ................. 362/32, 145, 146, 147, 362/152, 84, 304, 346, 300

[56] References Cited

U.S. PATENT DOCUMENTS

| | | | |
|---|---|---|---|
| 2,561,756 | 7/1951 | Shook | 362/32 |
| 3,740,541 | 6/1973 | Conradt | 362/146 |
| 3,813,071 | 5/1974 | Noryd | 362/146 |
| 3,902,056 | 8/1975 | Aizenberg et al. | 362/84 |
| 4,143,411 | 3/1979 | Roberts | 362/146 |
| 4,245,282 | 1/1981 | Sokol | 362/84 |
| 4,408,260 | 10/1983 | Miedel | 362/32 |
| 4,544,999 | 10/1985 | Kawanami et al. | 362/304 |
| 4,546,416 | 10/1985 | Pemberton | 362/84 |
| 4,763,984 | 8/1988 | Awai et al. | 362/32 |

FOREIGN PATENT DOCUMENTS 293542  2/1932  Italy .................................. 362/304

Primary Examiner—Ira S. Lazarus
Assistant Examiner—Richard R. Cole
Attorney, Agent, or Firm—Farris, Vaughan, Wills & Murphy

[57] ABSTRACT

An illumination system including a plurality of light guide sections with one end of each disposed proximate an end of at least one other. Each one of a plurality of illuminating couplers is positioned intermediate proximately disposed ends of the sections such that light emitted from each such illuminating coupler enters associated proximately disposed ends of the sections. A pre-selected portion of light conducted down one of the sections towards the proximately disposed end is transmitted past the associated illuminating coupler into another of the sections. The pre-selected portion of light is sufficient to temporarily replace the function of light from the associated illuminating coupler in the event of diminished light intensity therefrom.

20 Claims, 3 Drawing Sheets

ILLUMINATION SYSTEM WHICH REDUCES LOSS OF VISIBILITY CAUSED BY LAMP FAILURE

FIELD OF THE INVENTION

This invention is directed to an illumination system and in particular an illumination system in which the light emanating from light sources is distributed by some type of light guide.

BACKGROUND OF THE INVENTION

Presently there are two methods of providing well distributed illumination from light sources. In the first, a large enough number of light sources is employed to ensure that the resulting illumination has a sufficient degree of uniformity for the task at hand. This method is well known to those skilled in the art of illuminating engineering.

In the second method, a smaller number of light sources is utilized, and uniformity of illumination is achieved by distributing the light energy by means of light guides. This technique is exemplified by U.S. Pat. No. 4,750,798, which issued to L. Whitehead on June 14, 1988, which describes an illumination system in which the light guide is a prism light guide, and U.S. Pat. No. 4,105,293, which issued to Aizenberg et al. on Aug. 8, 1978, in which the light guide is a metallic reflector light guide.

The first method produces an irritating strobe light effect whenever a viewer travels relative to the light system such as in a subway or on a bridge.

The second method of providing distributed illumination is advantageous due to the economies of scale of utilizing a smaller number of more intense light sources. However, this reduction in the number of light sources only serves to exacerbate the problem which both techniques have, namely that failure of light sources can result in dangerously low levels of illumination.

Such failures can be particularly hazardous in situations where the light from sources adjacent to those which have failed cannot propagate very readily, and where there is a threat to life safety in the event that illumination is insufficient. A good example of such a situation is illumination in subway tunnels, where if a train becomes incapable of moving, passengers must walk out of the tunnel under potentially hazardous conditions, and where the narrow dimensions of the tunnel greatly reduce the extent to which light can propagate.

There are already known solutions to this problem of light loss from failure of sources. For example, it is possible at extra cost to increase the number of light fixtures, and/or the number of lamps per light fixture so that individual lamp failures do not cause too great a reduction in light. However, this is expensive, and does not eliminate the possibility of failure of an entire group of lamps because of a wiring problem. Another solution is to provide independent battery-operated electric lamps which turn on in the event that light from the main system fails, however this is generally a prohibitively expensive solution.

SUMMARY OF THE INVENTION

It is therefore an object of this invention to provide an improved means of minimizing the loss of visibility resulting from the failure of one or more light sources in a lighting system. These and other objects of the invention are achieved in a system which includes a plurality of light guide sections and illuminating couplers, in which the illuminating couplers provide light which is distributed by the light guides, and the illuminating couplers also transfer light between the light guide sections they couple. It is therefore a property of the invention that some of the light from any given illuminating coupler will travel throughout all of the sections of light guide so that visibility loss due to lamp failure is substantially reduced.

In general, such a system may include three or more light guide sections, and two or more illuminating couplers, in which at least one end of each light guide section is connected to the end of at least one other light guide section by at least one illuminating coupler and each illuminating coupler connects the ends of at least two light guide sections. Each illuminating coupler incorporates a first means for directing light emitted therefrom into the end of at least one of the light guide sections connected by the coupler. Light which is directed into a given light guide section is conducted along that section and partially transmitted to the coupled end of each such section. The illuminating couplers have the property that such light emanating from the end of one or more of the light guide sections connected by such couplers will be directed into the end of at least the one light guide section connected by the same coupler into which the first means directs light.

The illuminating couplers may contain electric lamps and reflectors for directing light into light guide sections, or may contain a means for redirecting light from an external source into light guide sections. The means for transferring light from the end of one light guide section to the end of another light guide section may be a light guide within the illuminating coupler or may result from the geometrical configuration of the reflectors which direct light into the light guides.

As a further means of reducing loss of visibility in the event of lamp failure, the light escaping from the light guide sections may be reflected off reflectors which are at least in part phosphorescent such that phosphorescent emission of light will continue after failure of all electric sources. A further refinement of this concept involves placing such phosphorescent materials within the light guide sections in a manner which usefully redirects light radiation during normal operation of the system, and which further results in continued phosphorescent emission in the event of lamp failure.

BRIEF DESCRIPTION OF THE DRAWINGS

The novel features believed characteristic of the invention are set forth in the appended claims. The invention itself, however, as well as other features and advantages thereof, will be best understood by reference to the detailed description which follow, read in conjunction with the accompanying drawings, wherein:

DESCRIPTION OF THE PREFERRED EMBODIMENTS

A conventional illumination system employing light guides consists of one or more sections of light guides which are independently illuminated in the sense that light which enters one section of light guide cannot significantly illuminate other sections of light guide. It is therefore a property of such light guidance systems that failure of the source of illumination for any given light guide section will result in the section being completely without light. This is a serious problem, particularly since the resulting area which would be without illumination could be quite large and it could represent a safety hazard.

Figure 1:
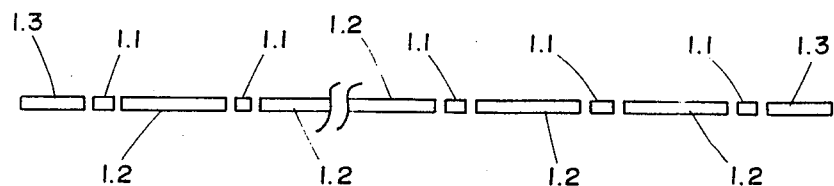
FIG. 1 illustrates an example layout of light guide sections and illuminating couplers.

FIG. 1 depicts an example of an illumination system which overcomes this difficulty. The system consists of a number of illuminating couplers 1.1 interspersed along a length of light guide consisting of individual sections 1.2 between illuminating coupler and terminating sections 1.3 having an illuminating coupler at one end only. The radiation emanating from the illuminating couplers 1.1 has an angular distribution which in combination with the chosen characteristics of the light guides 1.2 result in a substantial portion of the radiation which emanates from any given illuminating coupler reaching the next illuminating coupler. The nature of this relationship will depend on the type of light guide employed. For example, prism light guides, solid dielectric light guides and lens guides all have a maximum angle beyond which they cannot transmit light, and it is desirable for the illuminating coupler to emit radiation which is predominantly within this maximum angle. Furthermore, most light guides have a loss rate per unit length which increases as the angular divergence of the light increases, and therefore the maximum length of the light guide units 1.2 will increase as the light output of the luminaire unit 1.1 is better collimated.

Figure 2:
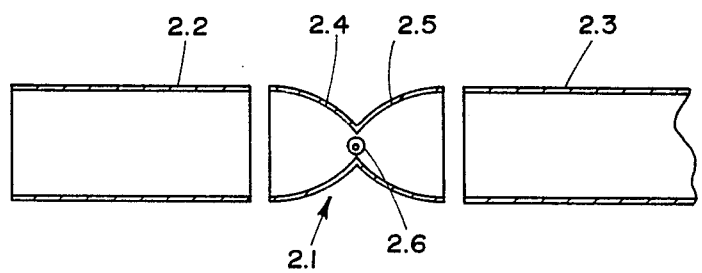
FIG. 2 is a cut-away view showing an example of the relationship between the illuminating coupler connecting two light guide sections.

FIG. 2 is an example of the physical orientation of an illuminating coupler with respect to the light guide sections. In this example, the illuminating coupler 2.1 comprises an electric light source 2.6 mounted in the center of two reflectors 2.4 and 2.5, which direct radiation emanating from the light source 2.6 into the desired range of angles such that light reflecting off reflector 2.4 enters light guide 2.2, and correspondingly light reflecting of reflectors 2.5 enters light guide 2.3.

Figure 3:
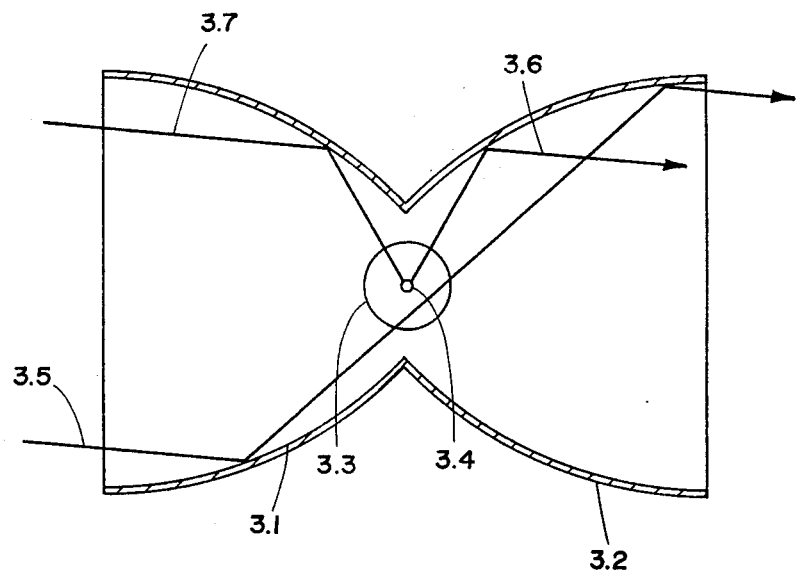
FIG. 3 is a cut-away view showing one geometrical design for the illuminating coupler which allows radiation to be transmitted in the desired fashion.

FIG. 3 is an enlarged view which shows how this particular reflector configuration enables light which emanates from the end of one light guide to pass through the illuminating coupler and into the light guide on the opposite side of the luminaire unit. The electric lamp consists of a transparent glass envelope 3.3 and significantly smaller light emitting element 3.4 situated inside the envelope. The lamp is mounted in the center of two reflectors 3.1 and 3.2. These reflectors shapes are carefully selected so that a typical ray 3.5 entering reflector 3.1 from the light guide will be reflected through the central region occupied by the lamp and pass around or through the transpaent envelope of the lamp 3.3. The ray 3.5 so reflected is unlikely to strike the light emitting elements 3.4. The ray 3.5 then continues on to reflect off reflector 3.2 in such a way that it has a substantial probability of being within the desired angular range when it enters the light guide on the opposite side of the luminaire. With regard to light rays emanating from the light emitting elements 3.4, example ray 3.6 will bounce off reflector 3.2 and will then be within the desired angular range for the light guide. Similarly, example 3.7 will bounce off reflector 3.1 and will then be within the correct angular range for the other light guide.

It will be apparent to those skilled in the art of reflector design that a great many reflector shapes will exhibit the desired reflective behavior, at least to some extent. The reflector aperture facing the light guide sections is larger than the central aperture containing the lamp and the reflector surfaces are concave and specularly reflective. An ideal shape for such a reflector in a system of circular cross section is the optical reflector shape known as a compound parabolic concentrator. However, the shape need not be perfect or exact in order to achieve the broad goals of transferring a substantial portion of light within the desired angular range from one guide to the next and directing a substantial portion of the light output of the lamp into the guides within the desired angular range.

Figure 4:
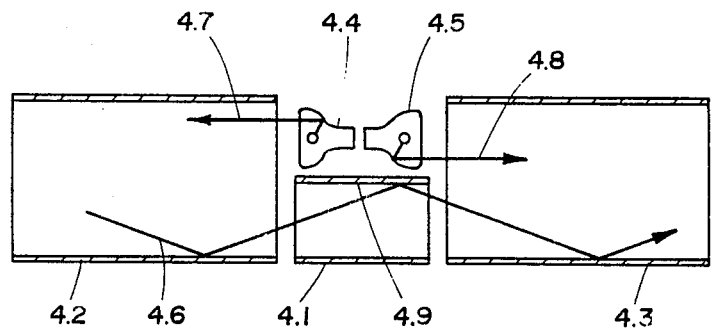
FIG. 4 is a cut-away view showing another design for the illuminating coupler which also allows radiation to be transmitted in the desired fashion.

FIG. 4 depicts an alternate illuminating coupler 4.1 in which a portion of the cross sectional area of the structure contains light source units 4.4 and 4.5 and the remainder of the cross sectional area consists of a smaller light guide 4.9 which carries a portion of the light reaching the illuminating coupler from guide 4.2 through the coupler and into guide 4.3, as shown by example ray 4.6. The light source units 4.4 and 4.5 contain reflective elements which direct the radiation shown in example rays 4.7 and 4.8 into guides 4.2 and 4.3, within the desired angular range.

Figure 5:
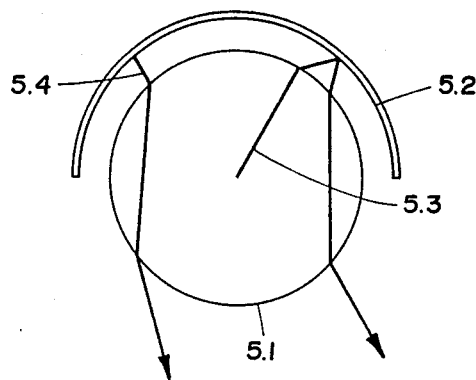
FIG. 5 is a cross sectional view of a light guide 30 section in which light is reflected from phosphorescent material positioned outside the guide.

FIG. 5 is a cross sectional view of a light guide such as a prism light guide, lens guide, or a solid dielectric light guide, in which light escaping from the light guide 5.1 is redirected by a reflective cover consisting, in part, of phosphorescent material 5.2. Example ray 5.3 is escaping from the light guide, reflecting off the phosphorscent material, passing through the light guide cross section again and escaping into the desired illumination region, while example ray 5.4 is being directly emitted by the phosphorescent decay in cover 5.2, as occurs even after the lights are turned off. In this design, the phosphorescent material could consist of a zinc sulfide based phosphorescent system. Other materials could be employed, providing that the material has the property that it stores energy received from the light emanating from the guide during normal use, and releases such stored light energy slowly over a period of time so as to provide a level of visibility to the light guide systems even after all electric lights have turned off.

Figure 6:
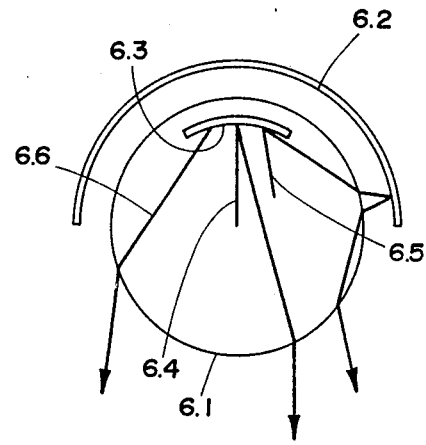
FIG. 6 shows a cross section iof a light guide section, in which radiation is directed out of the guide by means of scattering off of a phosphorescent material positioned within the guide.

One disadvantage of the concept of using an outer cover of phosphorescent material is that most phosphorescent paints are not as reflective as might be desirable for efficient redirection of light by such a cover, and moreover phosphorescent materials are more expensive than conventional white reflective materials. A solution to this difficulty is shown in FIG. 6, in which light guide 6.1 has the property that light radiation which is scattered outside the desired angular range will rapidly escape from the guide. This is the case for prism light guides, dielectric light guides, and lens guides, for example. In this figure the phosphorescent material 6.3 is located inside the guide, and causes such scattering to occur. A further enhancement is the reflector 6.2 which ensures that all scattered light leaves in the desired direction. This design has the further advantage that the phosphorescent material is exposed to the full intensity of light within the guide, rather than the dimmer intensity light housed outside the guide. Thus, residual lighting in the event of failure of the electric light sources can be more cost effectively provided by such a design. In the figure, example ray 6.4 is a ray which was already travelling in the light guide and which scatters off the phosphorescent material and exits in the desired region. Example ray 6.5 is also scattered but first reflects off outer cover 6.2 before entering the desired region. Finally, example ray 6.6 is produced by phosphorescent emission from the phosphorescent material after the electric lights are turned off.

It is worthwhile to consider the extent to which a system as described herein could improve safety of lighting a given situation. As an example, consider a tunnel measuring 12 feet in diameter, which is illuminated by two alternate systems. In the first, the minimum desired level of approximately 1 foot candle is provided by 50 Watt high pressure sodium luminaires spaced every 30 feet along the tunnel, and in the second the tunnel is illuminated by sections of 6 inch diameter prism light guide connected by illuminating couplers as shown in FIG. 2, employing 100 Watt high pressure sodium lamps, spaced every 100 feet. The illuminating couplers might be designed such that approximately 50% of the light directed from the coupler into a given section of guide will travel the 100 feet to the next copler, and approximately 50% of the radiation reaching that coupler will be directed through it and into the guide on the opposite side.

Figure 7:
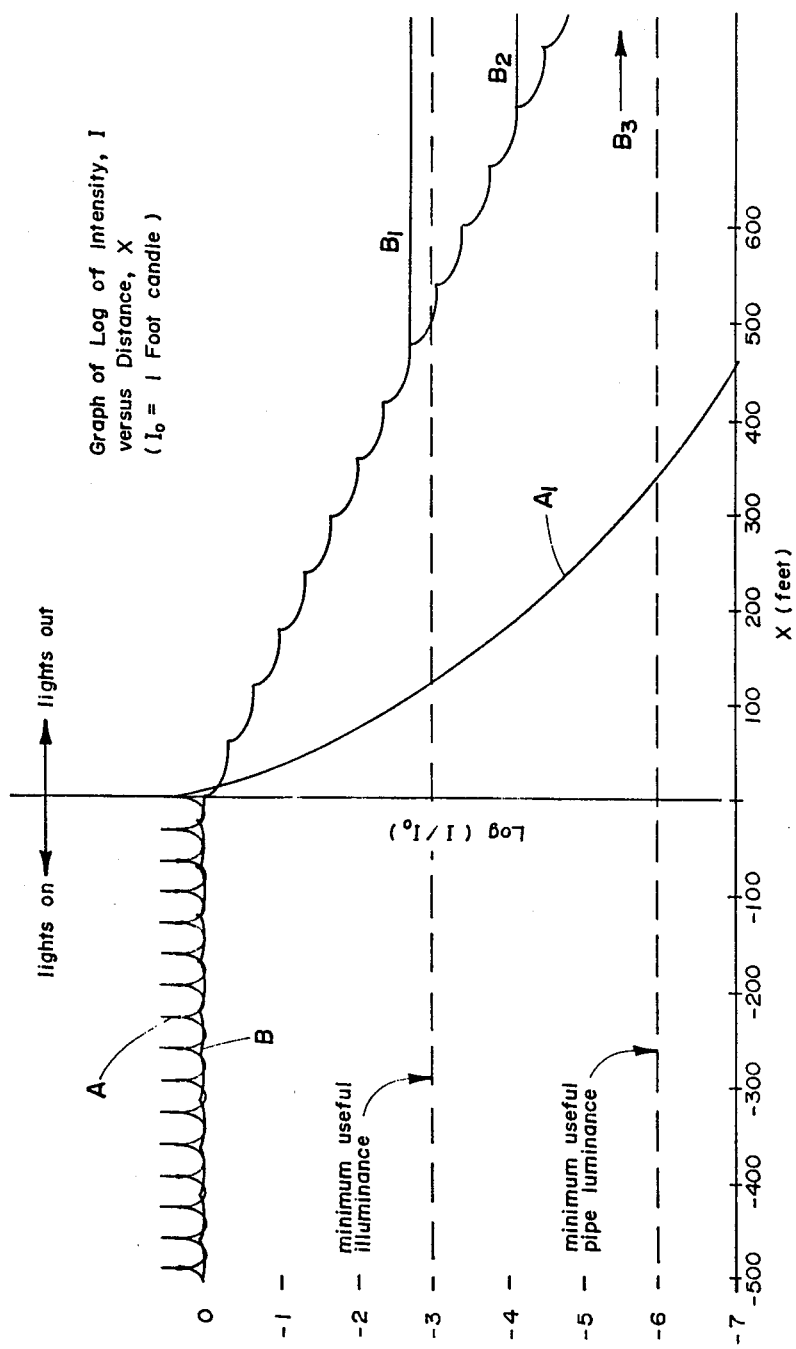
FIG. 7 is an illustrative graph of the logarithm of light intensity versus distance.

FIG. 7 is a very approximate graph, for illustration purposes only, showing the light intensity which would be measured in the tunnel if all lamps beyond a certain point at x=0 are switched off. It can be seen that the light level provided by the light guide/illuminating coupler system falls off much more slowly in the non-illuminated region than is the case for the conventional system. Curve A shows a possible rate of fall off for the conventional system in a moderately curved tunnel. Curve B1 shows the illumination from the light guide system five minutes after lights are turned off, and similarly B2 corresponds to two hours and B3 eight hours after lights have been turned off.

While there is not a sharp lower limit to the sensitivity of the human eye, it is roughly the case that the dashed line at $-3$ might be a lower limit for illumination which can make surfaces visible and the dashed line at level-6 might be a lower limit for illumination which makes the light pipe itself visible. It can therefore be concluded that for a few minutes after failure of all lamps beyond a certain point, there is unlimited distance at which some level of illumination is present, that even for up to eight hours after the lights ae turned off the light pipe itself is visible at all distances, and that a level of illumination making surfaces visible will always extend out to approximately 500 feet beyond the last illuminated lamp.

The invention described can therefore be seen to provide a very enhanced level of visibility in the event of substantial lamp and/or electrical failures, without the requirement of expensive additional components.

Although the principles of the present invention have been described with reference to particular embodiments, by way of example, it is understand that modifications may suggest themselves to those skilled in the art and it is intended that such modifications fall within the scope of the claims.

I claim:
1. An illumination system, comprising:
   (a) a plurality of light guide sections, one end of each disposed proximate an end of at least one other;
   (b) a plurality of illuminating couplers, each one being positioned intermediate proximately disposed ends of said sections such that light emitted therefrom enters at least one of the associated proximately disposed ends of one of said sections and a pre-selected portion of light conducted down another of said sections towards the proximately disposed end thereof is transmitted past said one illuminating coupler into said one section, said pre-selected portion being sufficient to temporarily replace the function of light from said one illuminating coupler in the event of a diminishing of light intensity emitted therefrom and each of said light guide sections having a sufficiently high reflectivity so that a sufficient fraction of light travelling down said each section reaches an opposite end thereof so that when transmitted into said one section maintains visibility in a surrounding region being illuminated.

2. An illumination system according to claim 1, wherein said illuminating couplers each have a light source and a reflector for directing light into proximately disposed ends of at least two of said light guide sections.

3. An illumination system according to claim 1, wherein said illuminating couplers each have a light transmission path for transmitting a pre-determined portion of light conducted down one of said light guide sections towards a proximately disposed end thereof, into another of said light guide sections.

4. An illumination system, comprising:
   "n+1" light guide sections where "n" is a positive integer;
   "n" illuminating couplers, wherein one end of each of said light guide sections is coupled to an end of another of said light guide sections by one of said illuminating couplers and each illuminating coupler is coupled to ends of at least two light guide sections;
   a light source in each of said illuminating couplers;
   first means for directing light from said light source from each of said illuminating couplers into an end of at least one of said light guide sections coupled thereto; and
   second means for directing light emanating from an end of each of said light guide sections past a corresponding illuminating coupler into an end of at least one of said light guide sections coupled thereto such that if one of said illuminating couplers fails to introduce light via said first means, said second light directing means supplies sufficient light from another of said illuminating couplers to maintain a predetermined level of illumination sufficient for visibility in a region around each of said light guide sections.

5. An illumination system according to claim 4, wherein "n" is an integer having a value of two or more.

6. An illumination system according to claim 5, wherein said first light direction means directs light from an associated one of said illuminating coplers into at least two of said light guide sections coupled thereto.

7. An illumination system according to claim 6, wherein said light transmitting means directs light transmitted past said corresponding illuminating coupler from each coupled light guide section into at least another of said coupled light guide sections.

8. An illumination system according to claim 6, wherein said light source is an electric lamp and said first directing means is an illuminating reflector positioned adjacent said lamp and having a pre-selected shape for directing light from said lamp to enter an end of a corresponding coupled one of said light guide sections with an angular distribution of intensity suitable for transmission along said corresponding coupled light guide section.

9. An illumination system according to claim 8, wherein said second light directing means includes a light transmission path past said electric lamp from one of said light guide sections into another light guide section coupled thereto.

10. An illumination system according to claim 8, wherein said illuminating reflector has opposed first and second concave surfaces, wherein:
   (a) each of said concave surfaces has a light entrance aperture which is approximately centered in a corresponding one of said surfaces, and opposing said entrance aperture a larger light exit aperture having a size and shape similar to the cross-sectional size and shape of said light guide sections;
   (b) said concave surfaces being oriented such that the direction from the entrance to exit aperture in said first surface is opposite to the corresponding direction in said second surface, and the two entrance apertures are substantially coincident; and
   (c) the light emitting portion of the said electric lamp is approximately centrally located within the two entrance apertures.

11. An illumination system according to claim 10, wherein said two surfaces are each substantially in the shape of compound parabolic concentrators.

12. An illumination system according to claim 10, wherein the light emitting portion of said electric lamp occupies only a small portion of the area of the entrance apertures.

13. An illumination system according to claim 5, wherein said second light directing means is a transmitting reflector positioned adjacent said illuminating coupler for reflecting light from one light guide section into another.

14. An illumination system according to claim 5, wherein said first means for directing light into the ends of said light guide sections includes one or more electric lamps whose radiation is collimated so as to enable transmission of light by said light guide sections and in which said second light directing means includes a light guide.

15. An illumination system according to claim 5, including a reflector extending longitudinally adjacent said light guide sections and having a surface coated with a phosphorescent material for storing energy from light incident from said light guide sections and emitting light from subsequent phosphorescent decay into a desired illumination region.

16. An illumination system according to claim 15, wherein said phosphorescent reflector is external to said light guide.

17. An illumination system according to claim 15, wherein said phosphorescent reflector is internal to said light guide.

18. An illumination system according to claim 15, wherein said reflector is structured so as to scatter light incident thereon so as to increase the rate at which reflected light energy escapes from said light guide over the rate that would correspond to reflected light having the same angular distribution as the incident light.

19. An illumination system comprising:
a row of light guide sections;
a plurality of illuminating couplers, each of said couplers being intermediate ends of a pair of said light guide sections, said couplers including:
   (i) reflectors having opposed concave surfaces, each having the approximate shape of a compound parabolic concentrator;
   (ii) electric lamps mounted centrally within said opposing surfaces;
   (iii) light scattering reflectors at least partially phosphorescent mounted within said light guide sections; and wherein each of said lighted guide sections has a sufficiently high reflectivity such that a sufficient fraction of light traveling down one of said sections reaches an end thereof so that when transmitted into an adjacent section by way of one of said couplers maintains visibility in a region surrounding said adjacent section being illuminated.

20. A method of illumination comprising:
positioning a plurality of light guide sections so that ends of each are proximate ends of one or more of others of said light guide sections;
placing illuminating couplers intermediate said ends so that light emitted from each of said illuminating couplers is conducted into each corresponding coupled end of said light guide sections and so that a pre-selected portion of light conducted along each of said sections toward said corresponding coupled end is transmitted past an associated one of said illuminating couplers into another of said sections, said pre-selected portion of light being sufficient to temporarily replace the function of light from said associated one of said illuminating couplers in the event of diminished light intensity emitted therefrom.

* * * * *